United States Patent [19]
Wakeman

[11] 3,983,281
[45] Sept. 28, 1976

[54] TAPE STRUCTURES

[76] Inventor: Alfred W. Wakeman, Madison Road, Durham, Conn. 06422

[22] Filed: Apr. 9, 1975

[21] Appl. No.: 566,295

Related U.S. Application Data

[60] Continuation-in-part of Ser. No. 379,264, July 16, 1973, abandoned, which is a division of Ser. No. 159,796, July 6, 1971, Pat. No. 3,751,760, which is a continuation-in-part of Ser. No. 859,619, Sept. 22, 1969, abandoned, which is a division of Ser. No. 379,265, July 16, 1973, Pat. No. 3,851,353.

[52] U.S. Cl. ............................... 428/112; 428/257; 428/343
[51] Int. Cl.² .......................................... B32B 5/12
[58] Field of Search ........... 428/105, 107, 111, 112, 428/116, 118, 114, 115, 174, 257, 343

[56] References Cited
UNITED STATES PATENTS

| | | | |
|---|---|---|---|
| 2,843,153 | 7/1958 | Young | 138/55 |
| 3,645,833 | 2/1972 | Figge | 156/175 |
| 3,657,059 | 4/1972 | Figge | 156/161 |
| 3,694,284 | 9/1972 | Kromrey | 156/172 |
| 3,755,054 | 8/1973 | Medney | 156/181 |
| 3,767,499 | 10/1973 | Koss | 156/181 |
| 3,887,739 | 6/1975 | Kromrey | 428/116 |

*Primary Examiner*—James J. Bell
*Attorney, Agent, or Firm*—St. Onge Mayers Steward & Reens

[57] ABSTRACT

A flexible longitudinally continuous tape construction is disclosed for use in joining mating edges of juxtaposed members, the tape having an X-like configuration transversely of its length to provide paired legs adapted to receive and be secured along the edges of members to be joined. The tape is capable of serving as a pliable hinge to permit articulation of the joined members about an axis which may or may not be rectilinear; or it may also serve simply as a binding for joining members intended to be fixed relative to each other. The tape construction combines two sets of connector strand means running crosswise of the longitudinal axis of the tape, the strands in one set intersecting and crossing those of the other set to form an axis of intersection along the tape which is flanked by the four legs of the X, while other means are disposed along each leg integrating the connector strands to form with them porous matted portions spaced outwardly of the axis of the X to leave an open center in which the two sets of connector strands are free to shift relative to each other within the limits of the open center defined by the matted portions while retaining a definite single axis of articulation.

7 Claims, 6 Drawing Figures

U.S. Patent  Sept. 28, 1976  3,983,281
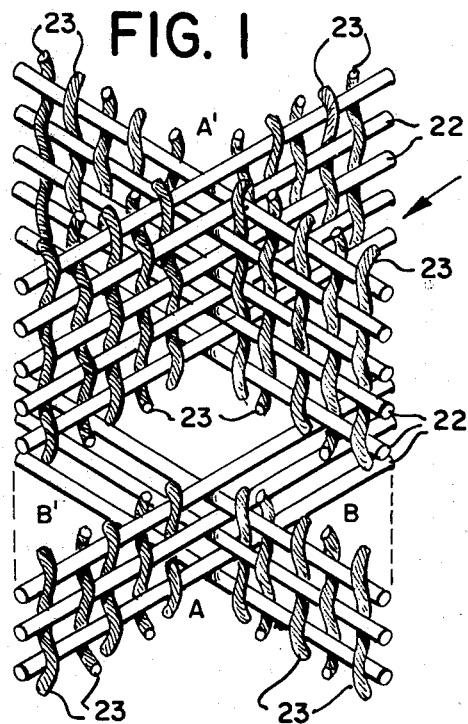
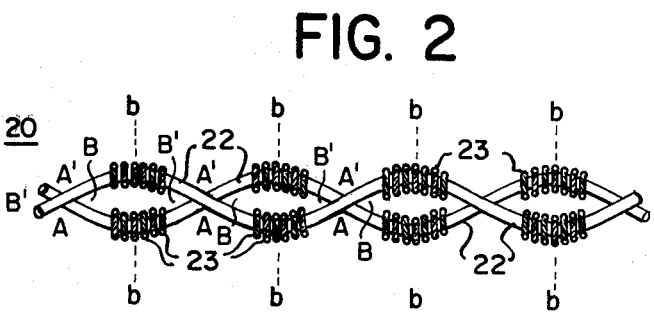
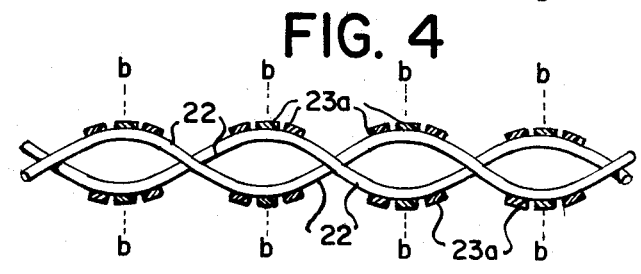
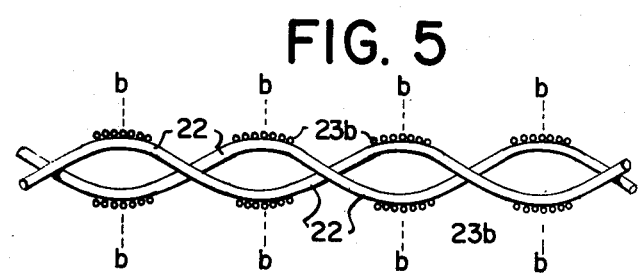
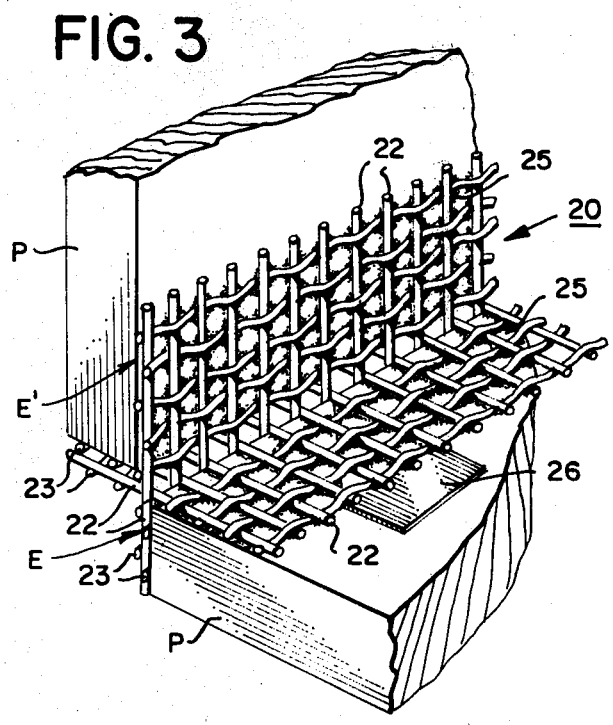
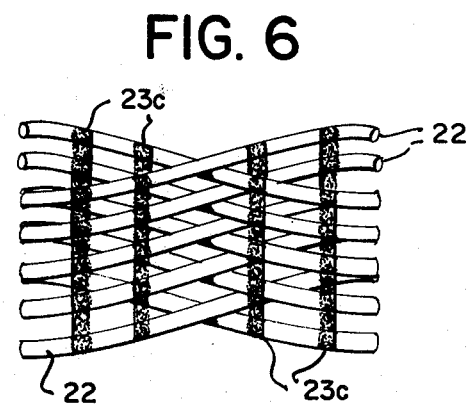

TAPE STRUCTURES

CROSS REFERENCE TO RELATED APPLICATIONS

This application is a continuation-in-part of my copending prior application Ser. NO. 379,264, filed July 16, 1973, now abandoned which was a division of application Ser. No. 159,796, filed July 6, 1971 now U.S. Pat. No. 3,751,760, which was in turn a continuation-in-part of application Ser. No. 859,619, filed Sept. 22, 1969, now abandoned. This application is also copending with a further divisional application, Ser. No. 379,265, filed July 16, 1973 now U.S. Pat. No. 3,851,353.

FIELD OF THE INVENTION

This invention pertains to continuous length, pliable tape structures useful in joining mating edges of adjacent members for making rigid or hinged connection between such members.

PRIOR ART BACKGROUND

The limiting strength of conventional hinged or jointed structures utilizing sheet or panel members of low unit strength to form the structure is the ability of such members to carry localized stresses at points of attachment. There has accordingly existed for some time a need for better means of joining the edges of materials having relatively low resistance to localized loading stresses, such as that imposed by rivets, screws, spot welding and the like. Sheet or panel materials which give rise to the problem include formed plastic sheet, foamed core/stressed skin laminates, corrugated board, chipboard, felt laminates and similar light weight, low cost but easily rupturable stock commonly used in fabricating containers or other vessels, display structures, protective pads, folio covers, etc.

Various tape constructions for joining mating edges of such materials have been advanced heretofore. A common arrangement is illustrated in U.S. Pat. Nos. 589,504, 1,260,197, 1,833,469 and 3,035,752 where the junction is formed by fabric or paper strips or tabs which are simply glued to the faces of the members to be joined. One particular difficulty with these arrangements is their poor resistance to peeling of the tabs from the faces of the joined members when forces are applied tending to move the members bodily relative to each other. Another form is illustrated in U.S. Pat. Nos. Re. 18,204, 1,988,036, 2,025,926, 3,442,415, and French Pat. No. 1,099,154 published Aug. 31, 1955. This form of joint-forming tape is characterized generally by the employment of two coextending tapes which are stitched together along their center lines to form an X-like configuration in cross section. The legs of the X are then glued or otherwise secured to the margins of the members to be joined. This represents an improvement over flat tape but the stitching, falling as it must at the axis of the hinge, weakens the structure at its most critical location.

Still another approach used for hingedly joining members is represented by the constructions shown in U.S. Pat. Nos. 46,071, 570,365 and 2,219,524. The arrangements there shown are not longitudinally continuous of the joined edges, so that a plurality of separate hinges must be used; and their attachment to the members to be joined presents problems. Molded plastic hinges of the type illustrated in U.S. Pat. Nos. 3,202,310 and 3,301,430 are designed to provide a continuous joint along the mating edges, but here again a problem is encountered in providing suitable means for securing such joint-forming constructions to the panel members.

Joint forming tapes of woven construction are disclosed in U.S. Pat. Nos. 2,200,882, 2,245,095, 3,374,793, in French Pat. No. 1,099,154 mentioned above, and in Britich Pat. No. 970,771 published Sept. 23, 1964. All of these arrangements relate to garment use, the first four being designed to join elasticized panels in a foundation garment and the fifth being designed to support zipper elements to permit them to be sewn into a garment. As will appear more fully later, none of these arrangements is capable of use for joining rigid panel members to provide a freely articulatable structure in which the articulated members are nevertheless constrained to hinge about a single definite axis.

Other prior art includes U.S. Pat. No. 2,766,504 for fabric binding or trimmings; U.S. Pat. No. 3,618,754 for a conformable elastic adhesive tape; and U.S. Pat. Nos. 2,949,264 and 3,294,605 both relating to joints in inflatable fabric structures. Again however these do not disclose a tape capable of forming a definite hinge axis between panel members joined by the structures described.

SUMMARY OF THE INVENTION

The present invention provides a pliable tape structure which can be manufactured in continuous lengths and easily cut to any desired length for application to the members to be joined, much the same as ordinary pressure-sensitive tape is applied to a surface, but which avoids the shortcomings of prior tape arrangements discussed above. The novel tape structure is designed to take advantage of the highest tensile strength-to-weight ratio of any material form, namely that of the filament. The invention applies this high strength property to hinges or joint-forming tape without creating localized stress points in the resulting structure, as the tape configuration puts the entire attachment area (glue or other bonding agent) in shear only and eliminates peel forces.

As mentioned, the novel tape may serve to join both articulated and non-articulated members and one of the principal objectives of the invention is to provide a hinge or joint-forming tape structure which affords uniform distribution of attachment stress over as large an area as practical of the members which it is desired to join, thereby avoiding localized or concentrated stresses at points of attachment, while minimizing susceptibility to peeling. In this way, advantage can be taken of materials of low cost but stress-oriented nature, such as paperboard, expanded or foamed plastic, etc., for use as basic structural members, without the need and attendant expense of special reinforcement or auxiliary construction at the point of attachment. The invention makes possible better application of maximum material properties to achieve great strength-to-weight ratios in joined structures.

Another objective is to provide a hinge-forming tape structure of flexible material which can be readily applied to panel members to be joined, whereby the joined members have greater capability for hinging movement while retaining a definite single axis of articulation. Other objectives include greater ease of application of the tape to members to be joined, and provision for specialized engineering applications, such as that involved in rolling hinges or in hingedly joining members whose mating edges are curved.

Use of the novel tapes for purposes other than hinging applications is of advantage where members to be secured together are subjected to loading or other forces tending to shift one member bodily relative to the other. The invention enables loadbearing structures such as display stands, mock-ups of prototype equipment, cartons or containers of various configurations and the like to be made of relatively low unit strength (easily rupturable) sheet stock. In joining members or sections of these devices with tape of the design herein disclosed, the inadequacy in peel strength of conventional pressure-sensitive adhesive or mending tape is also largely overcome.

In accordance with the teaching herein, engineering advantage is taken of inherent tensile strength in pliable strand or fabric materials, when used in the tape configurations disclosed, to form continuous length tape structures which are easily applied to the members to be joined, and which distribute the attachment stresses uniformly over the adjacent edges of joined members, thereby reducing the chance for failure of the materials at such locations.

Several forms of related pliable tape structures have been disclosed and claimed in my prior U.S. Pat. Nos. 3,751,760 and 3,851,353. This application is directed to a variant form of tape not claimed in that patent or application. As in the prior case, the tape structures of this invention are comprised generally of two essential components. One component consists of two sets of pliable strands disposed to run transversely of the joint to be formed, the strands of one set crossing those of the other to form a longitudinally extended X-like configuration having four legs projecting outwardly from the axis of intersection and having free outer ends, whereby to define four laterally open pockets running lengthwise of the tape in quadrantial arrangement about the tape axis. As will be apparent from the further description herein, either of the diametrically opposed sets of pockets thus formed are adapted to receive respective panel members to be joined by the tape, by securing the confronting faces of the legs in those pockets to the margins of the members being joined. The other component of the tape consists of means for joining or integrating adjacent connector strands along each leg of the X, such integrating means and connector strands together forming a porous matted portion in each leg which is spaced outwardly of the axis of the X to leave an open center in which the sets of connected strands in crossing the axis are free to shift relative to each other within the limits of the open center defined by the respective matted portions. The arrangement thus formed enables the axis of intersection to shift wtih articulation of members joined by the tape, yet the jointed structure retains a single definite axis of articulation. Integration of the cross strands in each leg may be accomplished by interweaving longitudinal or warp strands along each leg; it may also be accomplished in a non-woven structure by bonding non-woven fabric strips along each leg; also by applying bands of self-setting or thermosetting adhesive along the legs; or, if the cross strands are thermoplastic, by fusing adjacent cross strands together in bands extending along the legs.

The "single definite axis" mentioned above and in the following description refers to the functional axis at any incremental position of articulation of a member to which the tape is applied. In a rolling hinge for instance, the axis moves around the hinged member's edge while remaining rigidly parallel to the member's edge, providing rigid support of the member in all directions with the exception of the plane of articulation. The single definite axis is the intersection of the center lines of the transverse crossing strands. Application of the tape to a sharp-cornered edge may be seen as a limiting case of the rolling hinge, wherein the radius of the rolling hinge is defined by the distance from the cross-strand's center line to the hinged member's corner. Generally this distance is half the thickness of the cross-strand. The minimum "open center" of the tape herein referred to is dimensioned to accommodate the distance through which the axis travels around the hinged member's edge, plus clearance for thickness at the limits of articulation. The center opening may be considerably larger than this minimum without affecting rigidity of the axis.

Typical embodiments of the novel tape are illustrated in the accompanying drawings and described hereinafter.

DESCRIPTION OF DRAWINGS

FIG. 1 is a perspective view showing a portion of a woven form of tape structure embodying the invention;

FIG. 2 is a cross sectional view, on reduced scale, of a woven structure from which several tapes of the form shown in FIG. 1 may be formed by longitudinally cutting the structure;

FIG. 3 is a partial perspective view showing the method of attaching the tape to the edge of a member in preparation for joining it to another member;

FIGS. 4 and 5 are views similar to FIG. 2 showing alternate forms of longitudinal integrating means; and FIG. 6 is a perspective view of a small length of still another form of tape.

DESCRIPTION OF THE PREFERRED EMBODIMENTS

The woven tape structure 20 illustrated in FIG. 1 is composed in part of two sets of flexible strands 22 which are disposed to run crosswise of the length of the tape. The strands of one set alternately cross those of the other set to form an X-configuration which is elongated along the axis of intersection to provide four legs each projecting outwardly from the point of intersection to a respective free end. These four legs define open-sided pockets running lengthwise of the finished tape in quadrantial arrangement about the axis. Either pair of diagonally opposite pockets A, A' or B, B' is thus available to receive and be joined to the adjoining edges of a pair of panel members P, P' (see FIG. 3). Four sets of other strands 23 are interwoven longitudinally with cross strands 22 to form the respective integrated marginal web portions flanking the central axis of the tape. In the drawing, the several sets of strands 22, 23 are shown for purposes of clarity as spaced substantially apart. In practice however, the strands may be more closely interwoven so as to form continuous but porous mats constituting the legs of the tape structure.

The interweaving of the strands is interrupted short of the axis of intersection of cross strand 22 to leave the center or axial region of the finished tape relatively open, particularly where the tape is to form a rolling hinged joint, to allow greater freedom of movement between the two sets of cross strands. The open center arrangement, moreover, provides greater tolerance for slight inaccurate placement of the tape on the edge of a panel member.

FIG. 2 illustrates one method of weaving to provide tape having the foregoing structure. Such a configuration is readily woven on standard looms. As seen, the strip as woven is a multiple of the width of a single finished tape. This strip is then slit along dotted lines $b$, bisecting the loop portions so that each narrow strip resulting from this slitting produces a length of tape of X-like configuration in cross section having opposed sets of open-sided pockets A, A' and B, B'.

Paired legs of the tape may then be secured, for instance by pressure or heat sensitive adhesive, to the margins of members to be joined to form a hinged (or non-hinging) joint. The adhesive may be applied to the margins of the members, and the tape then pressed against it to effect attachment. However, the preferred arrangement is to incorporate the adhesive in bands along the legs of the tape. In the case of pressure sensitive adhesive, these bands are covered with protective peel strips until the tape is applied to form a joint.

FIG. 3 illustrates this more specifically. Woven tape 20, formed as described in connection with FIGS. 1 and 2, is provided along the panel confronting margins of opposite pairs of legs with a porous coat of pressure sensitive adhesive 25 which is temporarily protected by peel strips 26. When ready to attach the tape to the edges of the members to be joined, the tape is held so that its longitudinal axis is disposed along and in close contact with the edge of a panel P which is to be joined to a similar panel. Generally a first leg is applied along an edge so that the edge bisects the open center of the tape; for example the vertical edge of panel P as seen in FIG. 3. Next, the diagonally opposite leg is applied to the vertical edge of panel P', drawing it toward the axis of the tape. This operation is facilitated by first starting to peel, and then folding, the release strip back on itself at an angle to cause it to project beyond the edge of the tape, and then continuing to pull along the edge.

For simplification of illustration, the foregoing operation is shown in connection with attachment of an adjoining leg to the horizontal surface of panel P. This method of attachment exposes the pressure sensitive adhesive nearest the tape axis first, and then progressively outwardly, thus helping to pull the tape axis into close registry with the edges of the respective panels, so that when completed panels P and P' are firmly gripped along their adjoining margins. The arrangement not only facilitates the tape attachment process, providing a smooth tight surface contact between the tape and panel members, but aids in getting alignment of the tape axis and abutting edges of the panel members, even if there is some initial misalignment due to improper starting placement of the tape. By pulling the release or peel strips 26 in the manner discussed, the tape is made to lie straight and its natural axis is caused to conform closely with the edge of the member to which it is attached, and thus produce a rigid axis of maximum strength in the finished structure. In speaking of "natural axis" here, this is intended to mean not so much the axis defined by the cross strands in the tape as it exists before application to the edges of the members to be formed, but rather to that axis defined by the crossing strands as this is developed upon securing the tape to the members to be joined. The two conditions are identical in the case of a perfectly applied tape to perfectly straight, aligned edges of members to be joined. But such ideal condition seldom exists in practice, and it is one of the virtues of the novel tape that such perfect condition need not exist, because the tape will align itself to accommodate irregularity of the edges and/or inexact application to those edges, without resulting in a loose or wobbly hinged joint. This feature arises inherently from the tape construction wherein the connector strands, in crossing between web portions to which their edges are connected, are free to shift relative to each other, within of course the limits of the points where they are interwoven with the other strands to form the longitudinal web portions. Thus where some accommodation by the tape for inexact placement or nonrectilinear panel edges is desired, it is preferred to restrict the interweaving of the strands in forming the leg portions to space the interweaving outwardly of the tape axis slightly, producing the previously described "open center" effect with four integrated marginal web portions flanking the crossing axis.

Woven tapes of the type shown in FIGS. 1–3 are porous, to a greater or lesser extent depending on the tightness of the weave. Advantage can be taken of this porosity to produce a tape which incorporates a pressure sensitive adhesive, as seen in FIG. 3, to effect an initial or temporary adherence of the tape to the members to be joined, allowing the joint to be tested by articulating the members to make sure it functions properly, and removed and reapplied if needed for correction. Thereafter the tape legs may be saturated with a permanent type of adhesive to bond it securely to the panel members. It follows of course that the temporary pressure sensitive adhesive in this combination is so applied as not to block the pores of the weave and prevent subsequent penetration of the permanent adhesive.

The modified tape 20a shown in FIG. 4 is similar to the tape previously described except that no longitudinal or warp strands are woven into the cross strands. Instead, bands or strips of thermoplastic material 23a are applied along each leg of the multiple tape structure prior to slitting it into the individual tapes. These strips 23a may be fused during application so as to integrate the cross strands in each leg.

In FIG. 5 the arrangement includes the use of non-woven fabric or random fiber strips 23b glued or thermally fused with the cross strands 22 to integrate the respective legs of the tape.

FIG. 6 illustrates a tape 20c employing yet another integrating arrangement, in which the cross strands in each leg are joined by a series of bands 23c of self-setting or thermoplastic adhesive; or alternatively, where the cross strands themselves are thermoplastic, by fusing the cross strands themselves along narrow strips to form the integrating bands 23c.

What is claimed is:

1. A flexible tape for joining mating edges of adjacent panel members, said tape comprising:

two sets of flexible, spaced connector strands running crosswise of the longitudinal axis of the tape, the strands in one set intersecting and crossing those of the other set in alternation to form a longitudinally extended X-like configuration having four legs projecting respectively outwardly from the axis of intersection and having free outer ends to define four open-sided pockets running lengthwise of the tape in quadrantial arrangement about the tape axis;

means integrating adjacent connector strands along each leg to form therein a porous matted portion extending marginally along but spaced outwardly from said axis of intersection to leave an open center in which the two sets of connector strands in crossing said axis are free to shift relative to each other within the limits defined by said porous matted portions of said legs.

2. A flexible tape as defined in claim 1, wherein said means integrating said connector strands comprises longitudinal fiber strands interwoven with said connector strands tp define said porous matted portions of said legs.

3. A flexible tape as defined in claim 1, wherein said means integrating said connector strands comprises non-woven strands or bands thermally or adhesively bonded along each of said legs of said tape to define said porous matted portions of said legs.

4. A flexible tape as defined in claim 1, wherein said means integrating said connector strands comprises narrow strips of adhesive running along each of said legs of said tape to define said porous matted portions of said legs.

5. A flexible tape as defined in claim 1, wherein said connector strands are thermoplastic and are fused to adjacent connector strands along narrow bands running along each leg, which bands form said integrating means.

6. A pressure sensitive tape as defined in claim 1, which further includes a porous coating of pressure sensitive adhesive on confronting faces of opposite pairs of legs in the tape.

7. A flexible tape for joing mating edges of adjacent panel members, said tape comprising:

two sets of flexible, spaced connector strands running crosswise of the longitudinal axis of the tape with more than one half of the strands in one set intersecting and crossing those of the other set to form a longitudinally extended X-like configuration having four legs projecting respectively outwardly from the axis of intersection and having free outer ends to define four open-sided pockets running lengthwise of the tape in quadrantial arrangement about the tape axis;

means integrating adjacent connector strands along each leg to form therein a porous matted portion extending marginally along spaced outwardly from said axis of intersection to leave an open center in which the two sets of connector strands in crossing said axis are free to shift relative to each other within the limits defined by said porous matted portions of said legs.

* * * * *